Aug. 29, 1967  G. W. MORRISON  3,338,623
POWER OPERATED COVER MEANS FOR TRASH HAULING VEHICLE
Filed Aug. 9, 1965  2 Sheets-Sheet 1

GEORGE W. MORRISON
INVENTOR.

BY

ATTORNEY

GEORGE W. MORRISON
INVENTOR.

United States Patent Office 3,338,623
Patented Aug. 29, 1967

3,338,623
POWER OPERATED COVER MEANS FOR TRASH HAULING VEHICLE
George W. Morrison, Inglewood, Calif., assignor to Western Body and Hoist Company, Inc., Los Angeles, Calif., a corporation of California
Filed Aug. 9, 1965, Ser. No. 478,076
5 Claims. (Cl. 296—101)

This invention relates to vehicles and more particularly to an improved closed type trash chamber having power operated cover means for the charging opening readily shiftable to and fro between its open and closed positions between charging operations.

Many of the vehicles designed to pick up and haul trash utilize a trash-charging opening located in the top of the truck body and arranged to receive trash from various types of trash depositing devices. These arrangements are open to the serious objection that trash in the vicinity of the charging opening is likely to be swept from the vehicle by air currents while the vehicle is in transit or by action of the wind. In consequence, quantities of lighter trash are blown from the vehicle and clutter the roadway and the adjacent property.

It is therefore most desirable that simple, effective and trouble-free means be provided for closing the charging opening at all times except when actually receiving trash. It is important that the actuating means be operated easily and quickly and from control positions on the ground or in the driver's compartment.

To meet these and other needs there is provided by the present invention a single, rugged cover designed to fully close the charging opening when the latter is not in use and arranged to be shifted through a short path between closed and open positions clear of the charging opening. The use of a sliding closure involving the need for guide tracks or channels easily clogged with trash is avoided and instead the operating means for the cover includes linkage means supported from the side walls of the vehicle and operating to lift the cover through a shallow arcuate path and onto the top wall of the vehicle until it is desired to close the cover. Any suitable type of reversible motor means, such as a double acting cylinder, provides the necessary power and is easily controlled by operation of valve means located at one or more conveniently located operating stations. Desirably, the charging opening includes guide panels for the trash, and the operating means for the cover are so arranged as not to interfere with the presence of the trash guide panels.

It is, therefore, a primary object of the present invention to provide a top loading trash hauling vehicle closed except for a charging opening and provided with simple, rugged, easily-operated closure means for the charging opening.

Another object of the invention is the provision of a trash hauling vehicle having a closed trash chamber provided with an upwardly opening charging port having power operated closure means featuring operating linkage means along its opposite lateral sides.

Another object of the invention is the provision of a trash handling container having smooth interior sides with the reinforcing means therefor located exteriorly and along its sides and top and provided with a power operated closure for the charging opening, together with means for lifting the closure between its closed and open positions.

Another object of the invention is the provision of a trash storage receptacle having a charging opening and a normally closed closure therefor having a smooth interior surface substantially flush with the adjacent interior surfaces of said receptacle and cooperating therewith as a packing surface during to and fro operation of a trash pusher.

These and other more specific objects will appear upon reading the following specification and claims and upon considering in connection therewith the attached drawing to which they relate.

Referring now to the drawing in which a preferred embodiment of the invention is illustrated.

Figure 1:
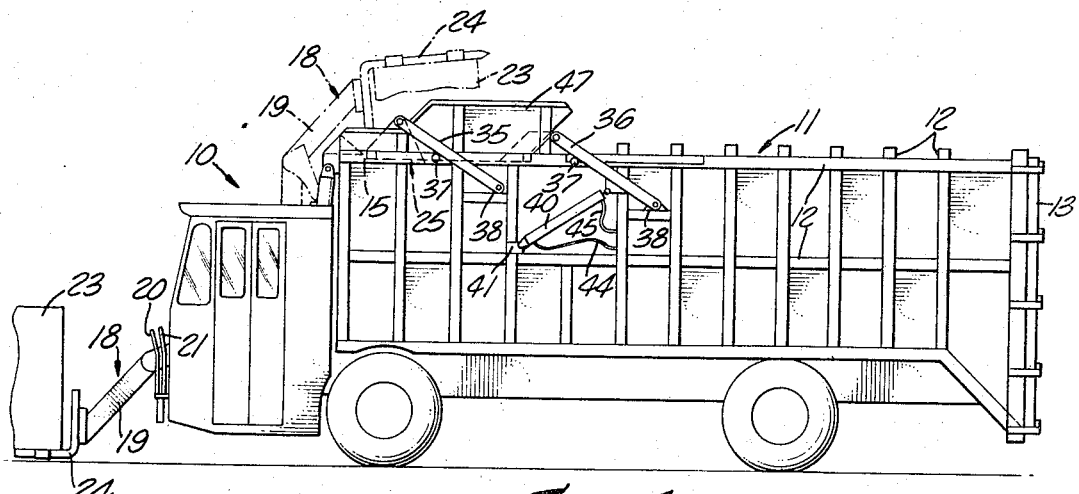
FIGURE 1 is a side elevational view of a trash hauling vehicle provided with one preferred embodiment of a power operated cover for its charging opening.

Referring initially more particularly to FIGURE 1, there is shown a trash hauling vehicle designated generally 10 supporting a trash chamber 11 having smooth interior surfaces, all reinforcing members 12, 12 being located on the exterior. The rear end of chamber 11 is provided with a suitable door 13 which is normally closed. The rear end of the chamber may be pivoted to the vehicle chassis so that it may be tilted upwardly to discharge the contents when the doors 13 are open. Desirably, any suitable pusher means 14 are also provided interiorly of the chamber and operated to and fro lengthwise thereof as disclosed more fully in my copending application for United States Letters Patent Ser. No. 478,124, filed Aug. 9, 1965 and functioning to shift the contents rearwardly during loading and when emptying the contents onto a dump.

Chamber 11 is provided with a charging opening 15 in its top. As herein shown, this opening is located at the front end of the container since the illustrated vehicle is equipped with a conventional front-mounted loading device 18. This loader includes a pivoting power operated linkage 19 mounted across the front of the vehicle and operated in known manner by fluid cylinders under the control of operating levers 20, 21. A bin 23 secured to lifting forks 24 of device 18 extending across the front end of linkage 19 can be filled with trash following which the bin is elevated and overturned into charging opening 15 in accordance with procedure well known to those skilled in this art.

Figure 2:
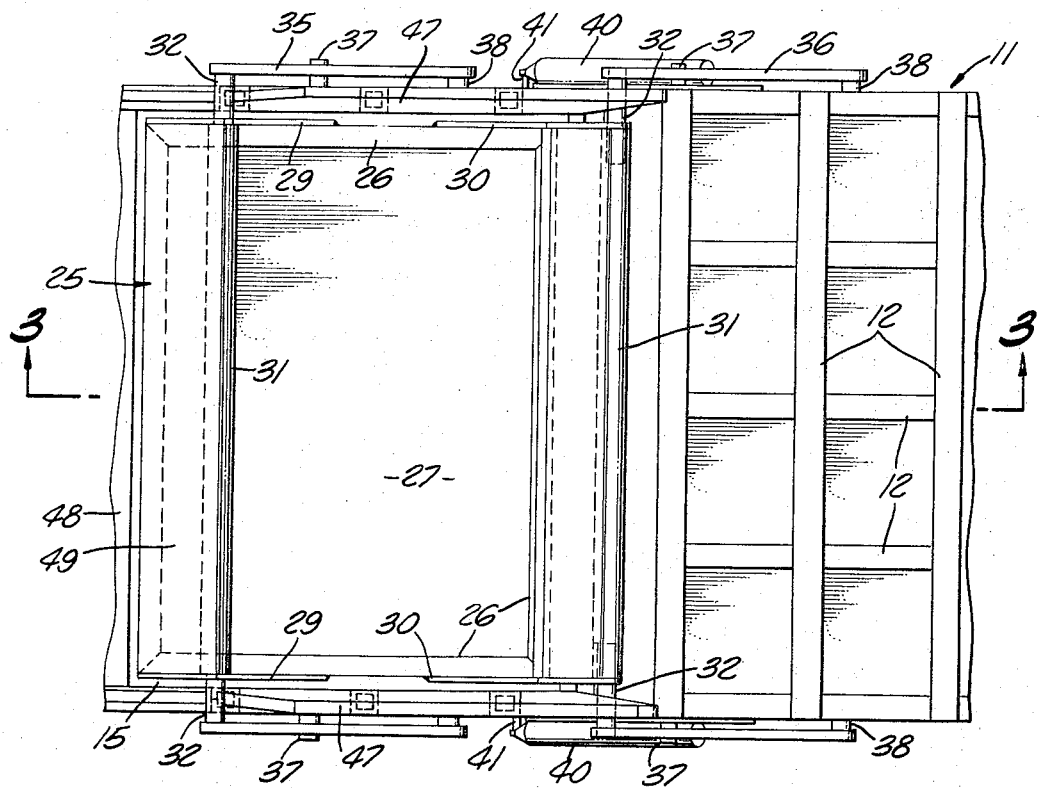
FIGURE 2 is a top plan view on enlarged scale showing the cover of the charging opening in closed position.
Figure 3:
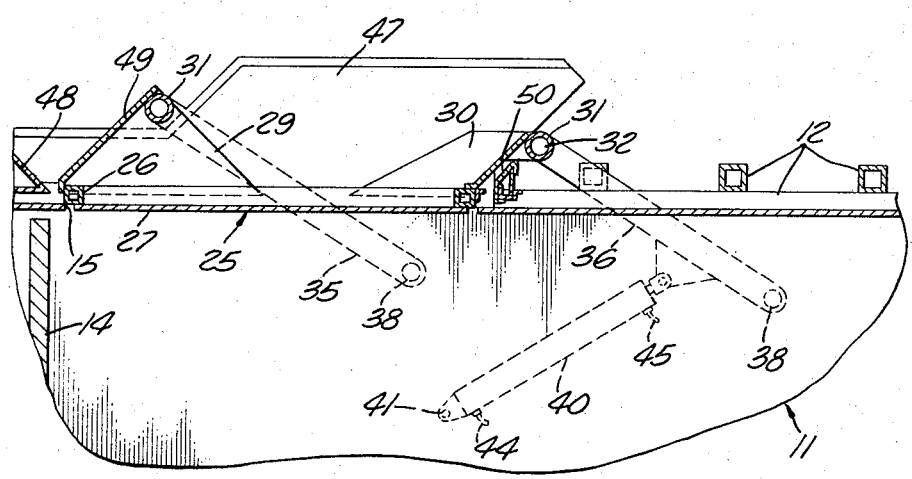
FIGURE 3 is a fragmentary cross-sectional view taken along line 3—3 on FIGURE 2.
Figure 4:
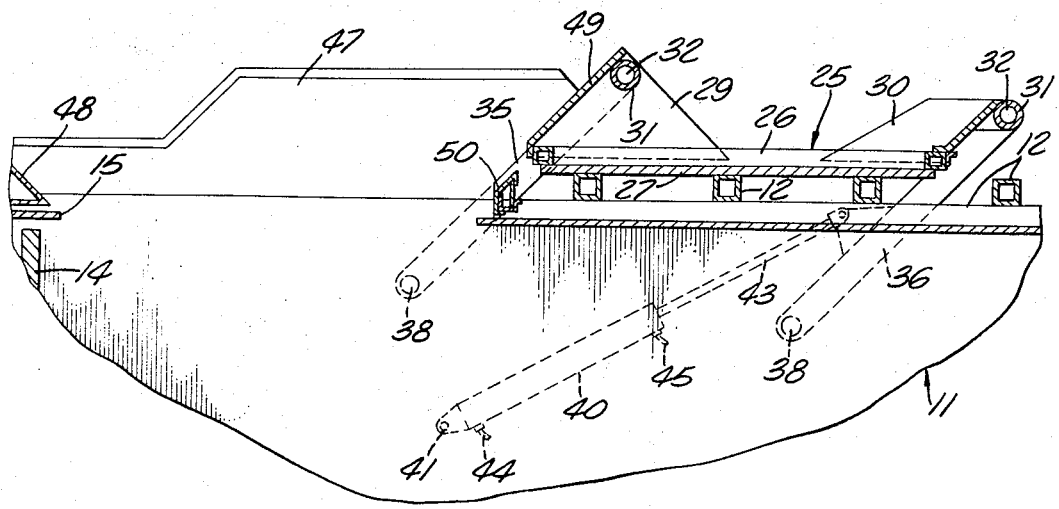
FIGURE 4 is a view similar to FIGURE 3 but showing the cover in open position.

Referring to FIGURES 2, and 3 and 4, it is pointed out that the cover means employed to close charging opening 15 is designated generally 25. This cover has a suitable main frame 26 closed on one side by panel 27. Projecting upwardly from the sides of frame 26 are gusset plates 29, 30 welded along their lower edges to frame 26. Welded to and opening through the forward and rear pairs of gusset plates 29, 30 are bracing tubes 31 in the ends of which are journaled trunnion-like members 32, 32 projecting inwardly from the upper ends of linkage members 35, 36 (see FIGURE 2). The lower ends of these linkage members are pivotally supported in brackets 38 (FIGURE 1) welded to the exterior side walls of container 11 in the position shown in FIGURE 1. Desirably, links 35, 36 lie parallel to one another in all operating positions.

The means for operating cover 25 and linkages 35, 36 comprises any suitable reversible motor, such as a double acting cylinder. These are herein illustrated as located along either side of chamber 11, but it will be understood that either a single or a pair of similar cylinders may be supported lengthwise along the top of the storage chamber and pivotally connected to cross pipe 32 or to suitable bracket means secured to the rear edge of closure 25. This latter arrangement has the advantage of neater appearance but requires longer cylinders. The lower end of the cylinder is shown pivoted to a bracket 41 secured to the truck and piston rod 43 is pivotally connected to operating link 36 between its opposite ends. Rigid stops 37, 37 projecting from the upper rim edges of the storage chamber are positioned to engage links 35, 36 and limits the closing movement of closure 25 with its inner smooth surface flush with the interior top surface of the chamber. Flexible fluid supply ducts 44, 45 extend from the opposite ends of cylinder 40 to valve controls, not shown, located at any desirable point on the vehicle, such as adjacent control levers 20 21 or within the driver's compartment. These control valves will be understood as including means for supplying pressurized fluid to either end of the cylinder as well as for conducting fluid away from the cylinder. Accordingly pressurized fluid supplied to the upper ends of the cylinders can be utilized to hold closure 25 firmly against stops 37 while pusher 14 is being used to crush trash against the closure while simultaneously pushing it rearward into the storage chamber.

It will be understood that charging opening 15 preferably includes side panels 47 having their lower edges lying flush with the interior side walls of the charging opening and a forwardly and upwardly inclined transverse panel 48. Additionally, cover 25 is provided with a downwardly and forwardly inclined panel 49 cooperating with a similarly disposed narrow panel 50 extending crosswise of the rear edge of opening 15 to guide trash into the container. These various panels prevent trash from hanging up across the edges of the charging opening and interfering with the closure of the cover.

The operation of the described construction will be readily understood from the foregoing description of the components and their operating relationship to one another. As shown in FIGURE 3, closure or cover means 25 is shown fully closed with operating links 35, 36 bearing against stops 37. Cylinders 40 are then retracted and the cover rests by gravity across the charging opening or is held pressed closed by pressurized fluid in motors 40.

When it is desired to transfer material through opening 15, the operator merely operates the valve, not shown, to admit fluid to the lower flexible hose 44. Fluid already present in the other end of the cylinder discharges through hose 45 to the reservoir. As the cylinder extends, links 35, 36 are rotated in unison clockwise as viewed in FIGURES 3 and 4, thereby lifting the cover through a shallow arc and away from the charging opening. In its fully open position, the cover comes to rest against the reinforcing members 12 across the top of chamber 11 and with its trash directing panel 49 disposed in a proper position across the rear edge of the opening to guide trash into the truck body. After loading device 18 has been operated to dump a load of trash into the truck the operator reverses the control valve for cylinders 40 and operates them in a reverse direction thereby again lifting cover 25 through a shallow arc from its open position to its fully closed position shown in FIGURE 3. Both the opening and closing operations are performed quickly and simply by the operating of the control valve.

While the particular power operated cover means for trash hauling vehicle herein shown and disclosed in detail is fully capable of attaining the objects and providing the advantages hereinfore stated, it is to be understood that it is merely illustrative of the presently preferred embodiment of the invention and that no limitations are intended to the details of construction or design herein shown other than as defined in the appended claims.

I claim:
1. In a trash collection vehicle having an elongated trash storage chamber provided with a trash receiving opening crosswise of the top forward end thereof and said chamber having smooth interior surfaces to facilitate the passage of trash thereacross while being compacted lengthwise of said storage chamber, that improvement which comprises: a rigid closure for said trash receiving opening having a smooth interior surface adapted to lie generally flush with the top interior surface of said chamber in the closed position of said rigid closure, power-operated means for moving said closure between the closed position thereof and an open position clear of said opening, said power operated means including a pair of links disposed on the opposite sides of said storage chamber with their upper ends pivoted to the rear corner ends of said closure and their lower ends pivoted to the chamber side walls below and very substantially rearwardly of the rear edge of said opening, said power-operated means also including a pair of reversible fluid-operated cylinders movably supported on the sidewalls of said chambers and having an operating connection to a respective one of said links and being operable through said links to lift the rear end of said closure out of a closed position with its interior surface substantially flush with the interior top surface of said trash chamber rearward of the rear edge of said opening and for transferring said closure upwardly and rearwardly through an arc to an open position rearward of said opening.

2. A trash vehicle as defined in claim 1 characterized in that said power-operated means for said closure includes means for holding the rear end of said closure forcibly and positively in closed position against pressures acting thereon while compressed trash is being transferred therebeneath and toward the rear end of said trash storage chamber.

3. A trash vehicle as defined in claim 2 characterized in that said power operated means for said closure includes a second pair of links along the opposite sides of said chamber and parallel to said first mentioned pair of links, and means pivotally connecting the opposite ends of said second pair of links respectively to the forward end portions of said closure and to the side walls of said chamber at points generally underlying the rear portion of said opening.

4. A trash vehicle as defined in claim 2 characterized in said means for holding the rear end of said closure positively closed includes stop means positively limiting closing movement of said closure whereby pressurized fluid supplied to said fluid-operated cylinders while said closure is closed is effective to hold the closure positively closed.

5. A trash vehicle as defined in claim 4 characterized in that said pairs of links are located along the exterior sides of said trash storage chamber, said closure having bracket means secured to and upstanding from the forward and rear corners thereof, and the upper ends of said links being pivotally connected to a respective upper portion of said bracket means, and upwardly and rearwardly inclined trash deflecting means secured crosswise of the forward edge of said closure and positioned to guide trash into said opening when said closure is in open position.

References Cited

UNITED STATES PATENTS

| | | |
|---|---|---|
| 1,059,221 | 4/1913 | Saylor. |
| 2,298,166 | 10/1942 | Richards _____ 214—77 |
| 2,989,196 | 6/1961 | Lugash _____ 214—77 |
| 3,130,845 | 4/1964 | French et al. _____ 214—302 |
| 3,195,744 | 7/1965 | Wender _____ 214—303 X |

GERALD M. FORLENZA, *Primary Examiner.*

ALBERT J. MAKAY, *Assistant Examiner.*